(12) United States Patent
Chang

(10) Patent No.: US 10,817,076 B2
(45) Date of Patent: Oct. 27, 2020

(54) INPUT SYSTEM, PERIPHERAL DEVICE AND ADJUSTMENT METHOD

(71) Applicants: DEXIN ELECTRONIC LTD., Donggaun, Guangdong (CN); DEXIN CORPORATION, New Taipei (TW)

(72) Inventor: Yuan-Jung Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 119 days.

(21) Appl. No.: 15/407,388

(22) Filed: Jan. 17, 2017

(65) Prior Publication Data

US 2018/0203525 A1 Jul. 19, 2018

(51) Int. Cl.
| | |
|---|---|
| G06F 3/023 | (2006.01) |
| G06F 3/038 | (2013.01) |
| G06F 3/039 | (2013.01) |
| A63F 13/22 | (2014.01) |
| A63F 13/98 | (2014.01) |
| A63F 13/24 | (2014.01) |

(Continued)

(52) U.S. Cl.
CPC ............ *G06F 3/0238* (2013.01); *A63F 13/22* (2014.09); *A63F 13/24* (2014.09); *G06F 3/0202* (2013.01); *G06F 3/023* (2013.01); *G06F 3/0219* (2013.01); *G06F 3/038* (2013.01); *G06F 3/0383* (2013.01); *G06F 3/0395* (2013.01); *G06F 3/03543* (2013.01); *A63F 13/98* (2014.09); *G06F 2203/0333* (2013.01); *G06F 2203/0337* (2013.01)

(58) Field of Classification Search
CPC .... G06F 3/0238; G06F 3/0233; G06F 9/4411; G06F 3/0202; G06F 3/0219; G06F 3/023; G06F 3/03543; G06F 3/038; G06F 3/0383; G06F 3/0395; A63F 13/77; A63F 13/98; A63F 13/24; A63F 13/22
USPC ....................................... 345/156–184; 710/8
See application file for complete search history.

(56) References Cited

U.S. PATENT DOCUMENTS

| | | | | |
|---|---|---|---|---|
| 6,593,911 B1 * | 7/2003 | Murphy | .............. | G06F 3/03543 345/163 |
| 2004/0203480 A1 * | 10/2004 | Dutton | .................. | G06F 3/0231 455/74 |
| 2009/0172199 A1 | 7/2009 | Huang | | |

FOREIGN PATENT DOCUMENTS

| | | |
|---|---|---|
| TW | 201416922 A | 5/2014 |
| TW | 201426311 A | 7/2014 |
| TW | 201500926 A | 1/2015 |

* cited by examiner

*Primary Examiner* — Jimmy H Nguyen
(74) *Attorney, Agent, or Firm* — Li & Cai Intellectual Property (USA) Office

(57) ABSTRACT

Provided herein are an input system, a peripheral device and an adjustment method. The peripheral device includes an input interface, a transmission interface and a processing module. The transmission interface is used for connecting a computer. The processing module is connected to the input interface and the transmission interface. The processing module transmits an input signal inputted from the input interface to the computer through the transmission interface at a repeat rate. The processing module receives an adjustment signal from the transmission interface and adjusts the repeat rate according to the adjustment signal, wherein the adjustment signal is outputted from another peripheral device connected to the computer. Accordingly, the present invention can operate a peripheral device to adjust the repeat rate of another peripheral device.

12 Claims, 7 Drawing Sheets

(51) Int. Cl.
*G06F 3/0354* (2013.01)
*G06F 3/02* (2006.01)

| signal | Scroll Lock | Caps Lock | Num Lock | action |
|---|---|---|---|---|
| adjustment signal 1 | OFF | ON | ON | To adjust the repeat rate to 10 characters per second |
| adjustment signal 2 | ON | OFF | ON | To adjust the repeat rate to 30 characters per second |
| adjustment signal 3 | OFF | on/off three times per second | OFF | To adjust the repeat rate to 60 characters per second |
| adjustment signal 4 | | OFF | OFF | To adjust the repeat rate to 120 characters per second |

FIG. 3

INPUT SYSTEM, PERIPHERAL DEVICE AND ADJUSTMENT METHOD

BACKGROUND OF THE INVENTION

1. Field of the Invention

The present invention relates to an input system, a peripheral device and an adjustment method; in particular, to an input system, a peripheral device and an adjustment method for adjusting the repeat rate of the peripheral device.

2. Description of Related Art

For most people today, computers have become an indispensable part of life, and fast operation of computers has become more important with the development of various types of software applications such as computer games, social networking applications, and the World Wide Web.

For example, it is often necessary to quickly enter commands for computer gameplay today. The repeat rate of peripheral devices of a computer is an important indicator when operating games and/or programs. The repeat rate is the rate at which a key character is continuously output when a key of the peripheral device is held down. For example, when a user holds down a key of the keyboard device, the keyboard device will continuously output the character of the key at a repeat rate until the user releases the key. For example, if the repeat rate of a keyboard device is 10 characters per second, the keyboard device will continuously output the character of the key at the rate of 10 characters per second until the user releases the key.

In many games and/or programs, the repeat rate of the peripheral devices has a significant effect on the operation. For example, pressing the "A" key of the keyboard device may produce a soldier in a real-time strategy game, while holding down the "A" key may produce the soldier at the repeat rate of the keyboard device. At this time, 10 soldiers per second are produced when using a keyboard device with the repeat rate of 10 characters per second, and 30 soldiers per second are produced when using a keyboard device with the repeat rate of 30 characters per second. For another example, pressing the left button of a mouse may shoot a bullet in a shooting game, while holding down the left button may shoot the bullet at the repeat rate of the mouse. At this time, 10 bullets per second are shot when using a mouse with the repeat rate of 10 characters per second, and 30 bullets per second are shot when using a mouse with the repeat rate of 30 characters per second. Thus, the repeat rate of the peripheral device greatly influences the operation of the games and/or the programs.

However, the repeat rate of a typical peripheral device is fixed and cannot be changed, and thus limits the operation of the games and/or the programs. In conventional technologies, manufacturers have developed specific peripheral devices with specific keys that allow the user to change the repeat rate of the peripheral device by operating the specific key.

However, when using a peripheral device with a specific key, the user has to change hand position in order to operate the specific key of the peripheral device during gameplay or program operation, which may interrupt the gameplay or the program operation. For example, when a user uses the left hand to operate the keyboard device and uses the right hand to operate a mouse to play an intense computer game, the user needs to change the position of the fingers to operate the specific key in order to change the repeat rate of the keyboard device, which may cause mistakes or interruption of the gameplay.

Therefore, an input system, a peripheral device and an adjustment method for improved adjustment of the repeat rate of the peripheral devices are desired.

SUMMARY OF THE INVENTION

An object of the present invention is to provide an input system, a peripheral device and an adjustment method for adjusting the repeat rate of a peripheral device by operating another peripheral device. The embodiments of the present invention achieve the purpose of adjusting the repeat rate of the peripheral device quickly and easily, and improving the efficiency of operating games and/or programs.

In order to achieve the aforementioned objects, according to an embodiment of the present invention, a peripheral device is applied to a computer and includes: an input interface; a transmission interface for connecting a computer; and a processing module that is coupled to the input interface and the transmission interface. The processing module transmits an input signal inputted from the input interface to the computer through the transmission interface at a repeat rate, and receives an adjustment signal through the transmission interface and adjusts the repeat rate according to the adjustment signal. The adjustment signal is outputted from another peripheral device connected to the computer.

In order to achieve the aforementioned objects, according to another embodiment of the present invention, an input system is applied to a computer and includes: a first peripheral device connected to the computer for outputting an adjustment signal; a second peripheral device connected to the computer and having an input interface; a transmission interface for connecting the computer; and a processing module coupled to the input interface and the transmission interface. The processing module transmits an input signal inputted from the input interface to the computer through the transmission interface at a repeat rate. And receives the adjustment signal through the transmission interface and adjusts the repeat rate according to the adjustment signal.

In order to achieve the aforementioned objects, according to still another embodiment of the present invention, which pertains to an adjustment method for an input system, the input system includes a computer, a first peripheral device and a second peripheral device. The first peripheral device and the second peripheral device are respectively connected to the computer. The adjustment method for the input system includes: transmitting the adjustment signal to the second peripheral device through the computer when the first peripheral device outputs an adjustment signal; and when the second peripheral device receives the adjustment signal, the second peripheral device adjusts the repeat rate of the second peripheral device according to the adjustment signal.

In order to further the understanding regarding the present invention, the following embodiments are provided along with illustrations to facilitate the disclosure of the present invention.

BRIEF DESCRIPTION OF THE DRAWINGS

FIG. 3 shows a schematic diagram of the signal code according to one embodiment of the present invention;

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
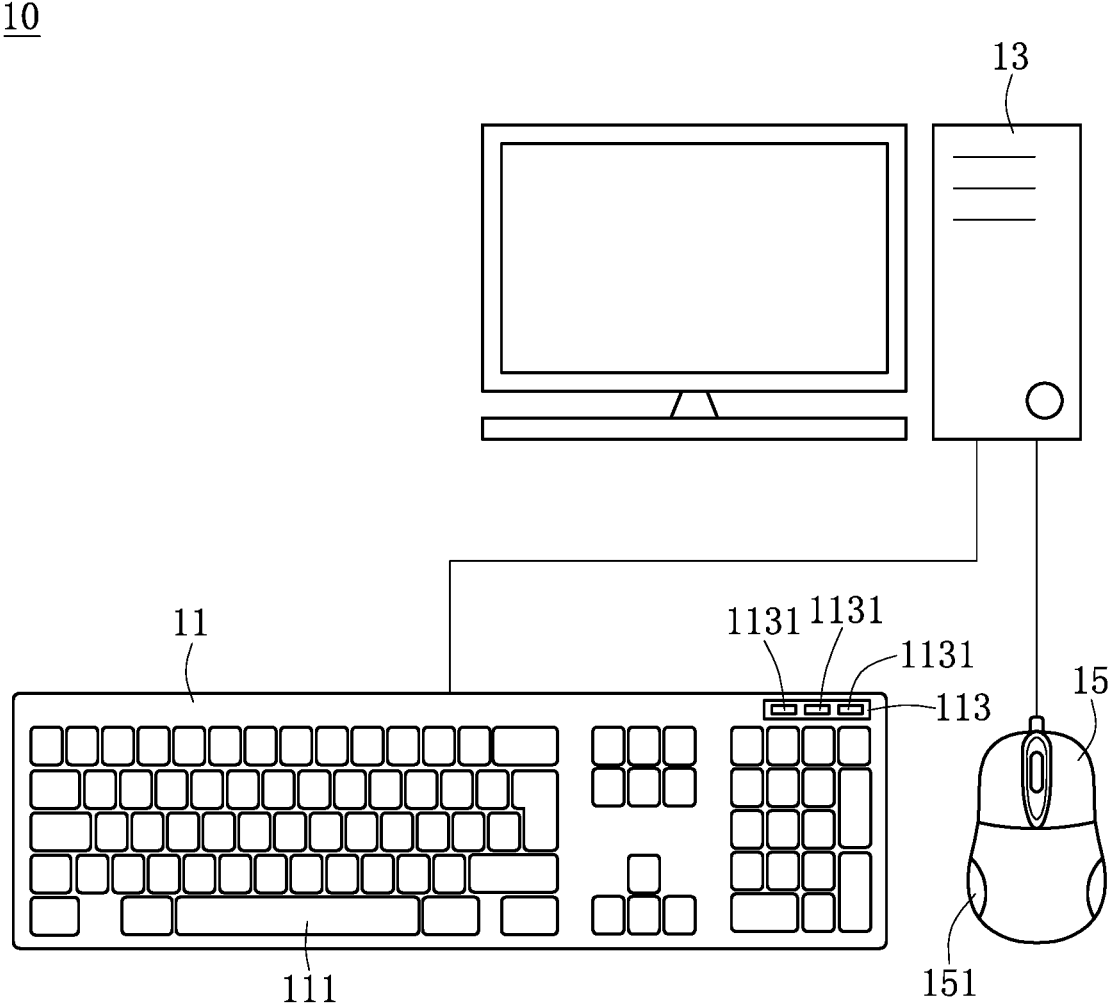
FIG. 1 shows a schematic diagram of an input system according to one embodiment of the present invention.

FIG. 1 is a schematic diagram of an input system according to one embodiment of the present invention. In FIG. 1, the input system 10 includes a first peripheral device 15, a second peripheral device 11 and a computer 13. The second peripheral device 11 includes an input interface 111 and an information prompt module 113. The information prompt module 113 has at least one light emitting element 1131. The first peripheral device 15 includes an adjustment interface 151. The second peripheral device 11 and the first peripheral device 15 can be linked wiredly or wirelessly to the computer 13.

In the present embodiment, the second peripheral device 11 is exemplified as a keyboard and the first peripheral device 15 is exemplified as a mouse. The input interface 111 of the second peripheral device 11, for example, could be a key circuit with a plurality of keys. The information prompt module 113, for example, could be an information prompt circuit with at least one light emitting element 1131. The light emitting element 1131, for example, could be the indicator lights of the Scroll Lock key, the Caps Lock key or the Num Lock key of the second peripheral device 11. The light emitting element 1131, for example, could be a liquid crystal display element, a light-emitting diode element, an organic light-emitting diode element, or other display elements capable of displaying characters or symbols, to which the present invention is not limited.

The user can operate the input interface 111 of the second peripheral device 11 (i.e. the keyboard) and/or use the first peripheral device 15 (i.e. the mouse) to operate the computer 13.

When the user wishes to adjust the repeat rate of the second peripheral device 11, the user can operate the adjustment interface 151 of the first peripheral device 15 to output an adjustment signal to the computer 13, and then the computer 13 can transmit the adjustment signal to the second peripheral device 11. The second peripheral device 11 adjusts the repeat rate of the second peripheral device 11 according to the adjustment signal received.

The adjustment interface 151 of the first peripheral device 15, for example, could be keys, a touch unit and/or a roller, to which the present invention is not limited.

The adjustment signal is encoded by the keyboard indicator light control instruction outputted from the computer 13 to the keyboard device. The adjustment signal, for example, could be the combination of the keyboard indicator light control instructions, that is, a combined on/off signal of the keyboard indicator lights. The adjustment signal could also be the on/off frequency of the keyboard indicator lights, to which the present invention is not limited, so that the computer 13 can directly transmit the adjustment signal to the second peripheral device 11 when receiving it from the first peripheral device 15, thereby achieving the purpose of using the first peripheral device 15 (i.e. the mouse) to adjust the repeat rate of the second peripheral device 11 (i.e. the keyboard). The details thereof are described in the following descriptions.

Figure 2:
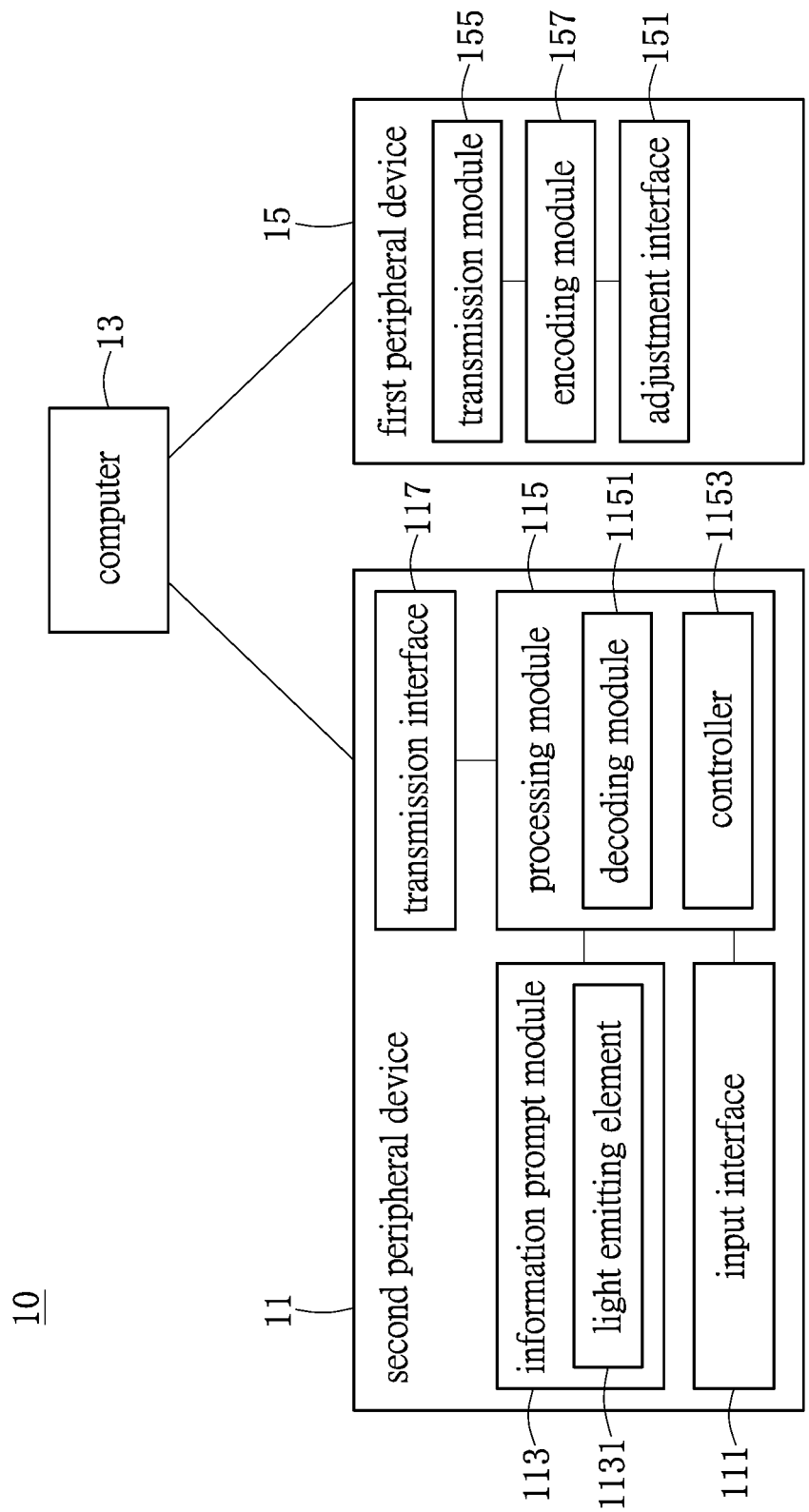
FIG. 2 shows a block diagram of an input system according to one embodiment of the present invention.

Referring to FIGS. 1 and 2, the latter of which is a block diagram of an input system according to one embodiment of the present invention, the input system 10 includes a first peripheral device 15, a second peripheral device 11 and a computer 13. The second peripheral device 11 includes an input interface 111, an information prompt module 113, a processing module 115 and a transmission interface 117. The processing module 115 is coupled to the input interface 111, the information prompt module 113 and the transmission interface 117, respectively. The processing module 115 includes a decoding module 1151 and a controller 1153. The information prompt module 113 includes at least one light emitting element 1131. The transmission interface 117 is coupled wiredly or wirelessly to the computer 13.

For convenience of explanation, the peripheral device 15 could include an adjustment interface 151, a transmission module 155 and an encoding module 157, but the peripheral device 15 may also include other related circuitry. The adjustment interface 151 is coupled to the encoding module 157, and the encoding module 157 is coupled to the transmission module 155. The transmission module 155 is coupled wiredly or wirelessly to the computer 13.

The processing module 115 of the second peripheral device 11, for example, could be a processing circuit with controllers and related circuits. In the present embodiment, the processing module 115 is exemplified by the controller 1153 and the decoding module 1151. The decoding module 1151, for example, could be a software or hardware decoder, and the encoding module 157, for example, could also be a software or hardware encoder, to which the present invention is not limited.

When the user wishes to adjust the repeat rate of the second peripheral device 11, the user can operate the adjustment interface 151 of the first peripheral device 15 to make the encoding module 157 generate an adjustment signal according to the keyboard indicator light control instruction outputted from the computer 13 to the keyboard device. The encoding module 157 wiredly or wirelessly transmits the adjustment signal to the computer 13 through the transmission module 155. Since the adjustment signal is encoded by the keyboard indicator light control instruction, the computer 13 can directly transmit the adjustment signal to the second peripheral device 11 when receiving it from the first peripheral device 15.

The processing module 115 of the second peripheral device 11 wiredly or wirelessly receives the adjustment signal through the transmission interface 117, and then the decoding module 1151 decodes the adjustment signal. The controller 1153 adjusts the repeat rate of the second peripheral device 11 according to the decoded result of the decoding module 1151 to change the repeat rate of the signal outputted to the computer 13 when operating the input interface 111 according to the adjustment signal, thereby achieving the purpose of operating the first peripheral device 15 to adjust the repeat rate of the second peripheral device 11. A more detailed description on coding will follow.

FIG. 3 is a schematic diagram of the signal code according to one embodiment of the present invention. In the embodiment drawn to FIG. 3, the adjustment signal 1 is an encoding of "the indicator light of the Scroll Lock key is off, the indicator light of the Caps Lock key is on, and the indicator light of the Num Lock key is on", and the default action of this coding is to adjust the repeat rate of the second peripheral device 11 to 10 characters per second. Therefore, when the processing module 115 of the second peripheral device 11 receives a signal encoded with "the indicator light of the Scroll Lock key is off, the indicator light of the Caps Lock key is on, and the indicator light of the Num Lock key is on", the decoding module 1151 decodes the signal received to obtain the action to adjust the repeat rate of the second peripheral device 11 to 10 characters per second. Then, the controller 1153 adjusts the repeat rate of the second peripheral device 11 to 10 characters per second according to the decoded result of the decoding module 1151 to make the signal outputting to the computer 13 at the repeat rate of 10 characters per second when operating the input interface 111.

In this embodiment, the adjustment signal 2 is an encoding of "the indicator light of the Scroll Lock key is on, the indicator light of the Caps Lock key is off, and the indicator light of the Num Lock key is on", and the default action of this encoding is to adjust the repeat rate of the second peripheral device 11 to 30 characters per second. The adjustment signal 3 is an encoding of "the indicator light of the Scroll Lock key is off, the indicator light of the Caps Lock key goes on/off three times per second, and the indicator light of the Num Lock key is off", and the default action of this encoding is to adjust the repeat rate of the second peripheral device 11 to 60 characters per second. The adjustment signal 4 is an encoding of "the indicator light of the Scroll Lock key goes on/off three times per second, the indicator light of the Caps Lock key is off, and the indicator light of the Num Lock key is off", and the default action of this encoding is to adjust the repeat rate of the second peripheral device 11 to 120 characters per second.

The encodings of the adjustment signal shown in FIG. 3 are merely illustrative, to which the present invention is not limited. In practice, the adjustment signal could be encoded by any combination of the on/off of indicator lights of the Scroll Lock key, the Caps Lock key and the Num Lock key.

In another embodiment of the present invention, the first peripheral device 15 is a mouse. The adjustment interface 151, for example, could be any possible combination of the left, right and/or scroll buttons of the first peripheral device 15. For example, pressing the left button and scrolling the scroll button up at the same time will output the adjustment signal 1, and pressing the left button and scrolling the scroll button down at the same time will output the adjustment signal 2, to which the present invention is not limited. The adjustment interface 151 could also be a specific button of the first peripheral device 15, such as a separate button other than the left, right and scroll buttons of mouse, to which the present invention is not limited.

In another embodiment of the present invention, the first peripheral device 15 is a keyboard. The adjustment interface 151, for example, could be any possible combination of the keys of the keyboard, to which the present invention is not limited.

In another embodiment of the present invention, the first peripheral device 15 comprises a control key (not shown in the Figures). The user can operate the control key to alternately output the adjustment signals. For example, the user presses the control key once to output the adjustment signal 1 and presses the control key once again to output the adjustment signal 2, so that the functions of the adjustment interface 151 are achieved by a single control key.

In another embodiment of the present invention, the transmission interface 117 and the transmission module 155, for example, could be wireless transmission circuits such as Bluetooth, WIFI, NFC, or ZigBee, and could also be wired transmission circuits such as USB or PS/2, to which the present invention is not limited.

In another embodiment of the present invention, the encoding module 157 includes an encoding table (not shown in the Figures). The encoding table could be implemented as a memory, a storage device or firmware, to which the present invention is not limited. The encoding table could store the coding information of the adjustment signal. The encoding module 157 generates the adjustment signal according to the encoding table.

In another embodiment of the present invention, the decoding module 1151 includes a decoding table (not shown in the Figures). The decoding table could be implemented as a memory, a storage device or firmware, to which the present invention is not limited. The decoding table could store the coding information of the adjustment signal. The decoding module 1151 decodes the adjustment signal according to the decoding table.

In another embodiment of the present invention, the first peripheral device 15 and the second peripheral device 11 may respectively be a mouse, a keyboard or a game controller, to which the present invention is not limited.

In another embodiment of the present invention, the first peripheral device 15 and the second peripheral device 11 may respectively be a mouse, a keyboard or a game controller, and are of different types.

In another embodiment of the present invention, the processing module 115 of the second peripheral device 11 increases or decreases the repeat rate when receiving the adjustment signal.

In another embodiment of the present invention, the processing module 115 of the second peripheral device 11 adjusts the repeat rate of the second peripheral device 11 to be the same as the repeat rate of the first peripheral device 15 when receiving the adjustment signal.

Figure 4:
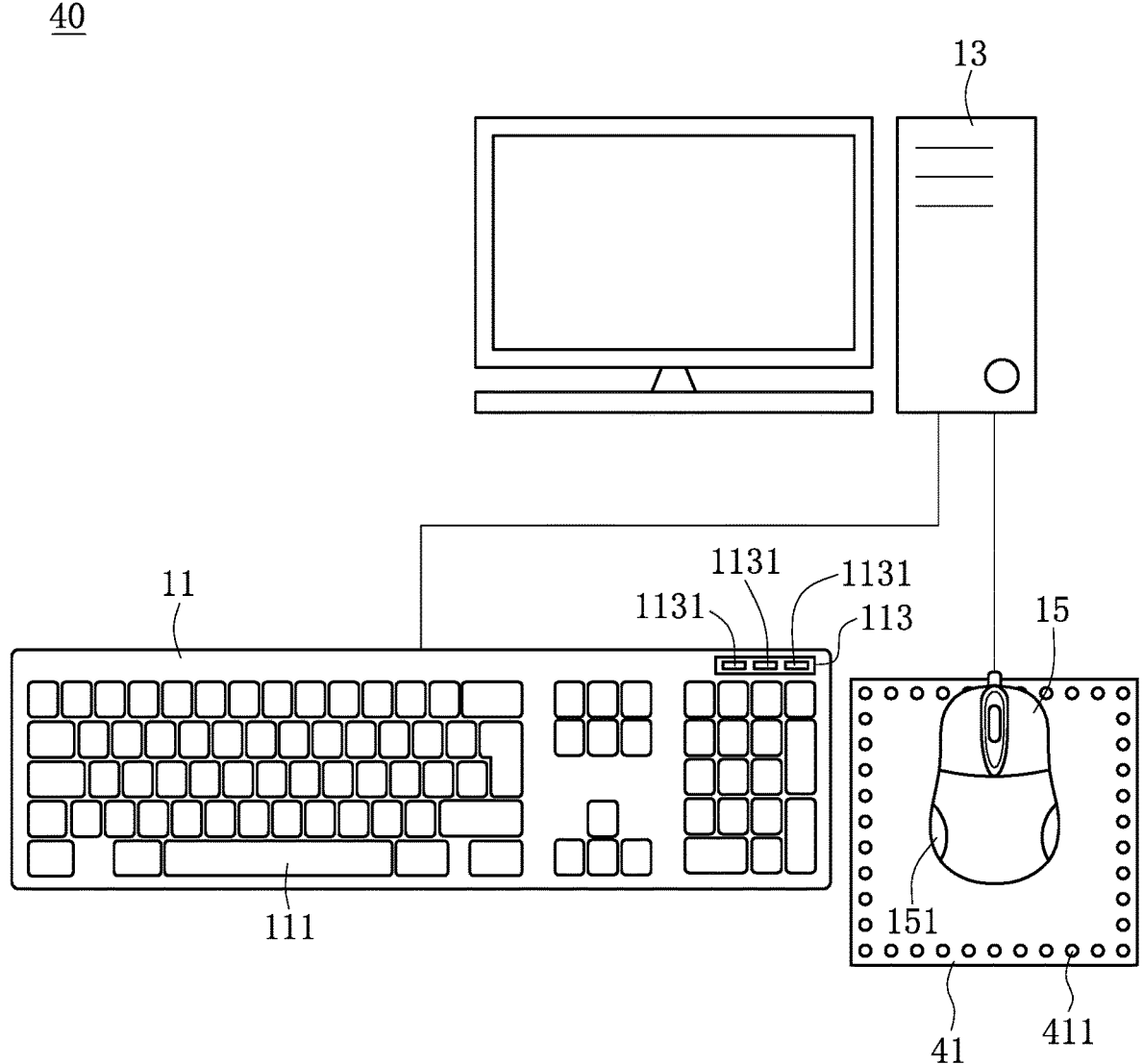
FIG. 4 shows a schematic diagram of an input system according to another embodiment of the present invention.
Figure 5:
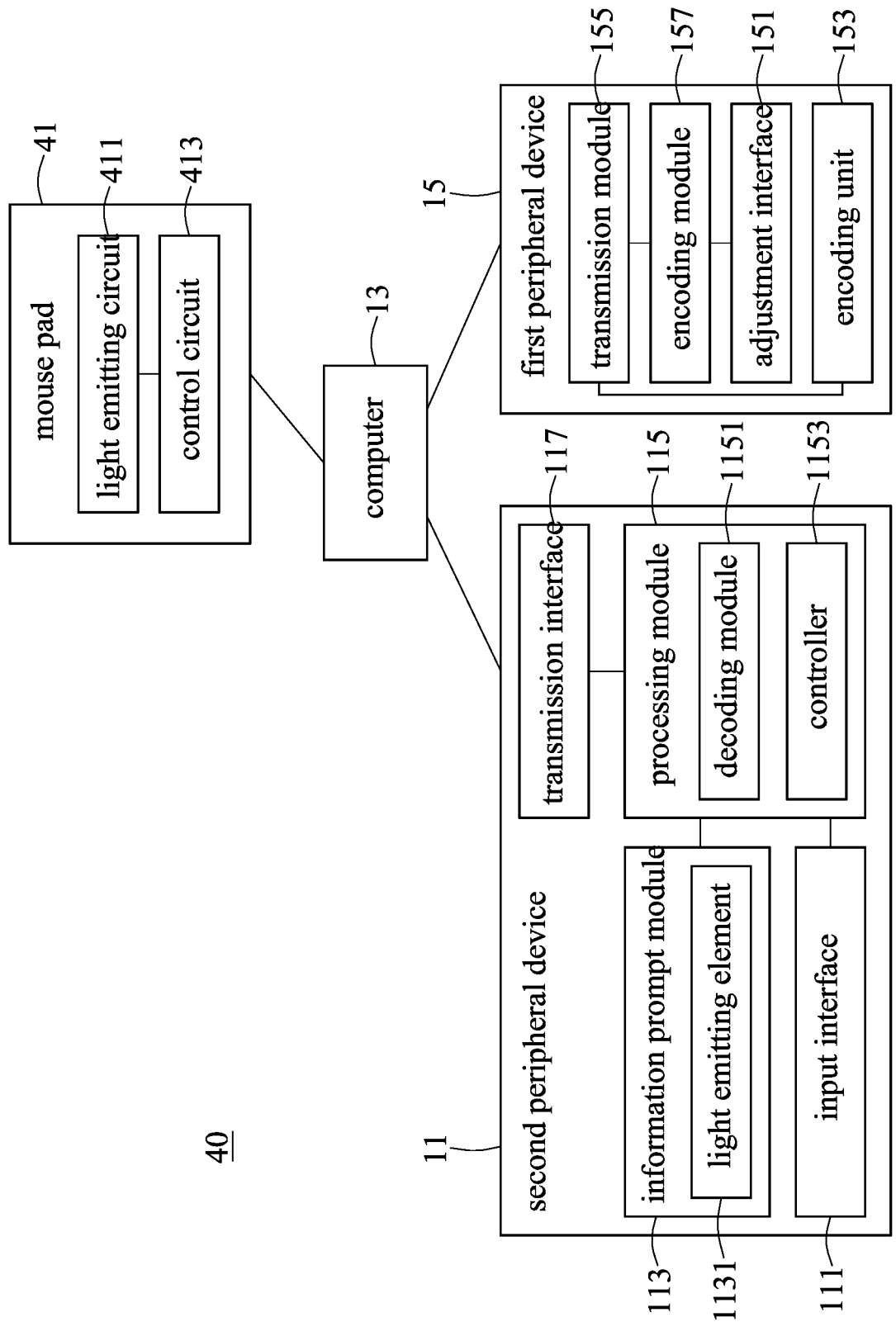
FIG. 5 shows a block diagram of an input system according to another embodiment of the present invention.

FIG. 4 is a schematic diagram of an input system according to another embodiment of the present invention. FIG. 5 is a block diagram of an input system according to another embodiment of the present invention. In FIG. 4 and FIG. 5, the input system 40 comprises a first peripheral device 15, a second peripheral device 11, a computer 13 and a mouse pad 41. The second peripheral device 11 includes an input interface 111 and an information prompt module 113, a processing module 115 and a transmission interface 117. The processing module 115 is coupled to the input interface 111, the information prompt module 113 and the transmission interface 117, respectively. The processing module 115 includes a decoding module 1151 and a controller 1153. The information prompt module 113 includes at least one light emitting element 1131. The transmission interface 117 is coupled wiredly or wirelessly to the computer 13.

For convenience of explanation, the first peripheral device 15 could include an adjustment interface 151, an encoding unit 153, a transmission module 155 and an encoding module 157, but the peripheral device 15 may also include other related circuitry. The adjustment interface 151 is coupled to the encoding module 157, the encoding module 157 is coupled to the transmission module 155, and the encoding unit 153 is coupled to the transmission module 155. The transmission module 155 is coupled wiredly or wirelessly to the computer 13.

The mouse pad 41, for example, could include a light emitting circuit 411 and a control circuit 413, but the mouse pad 41 may also include other related circuitry. The light emitting circuit 411 is coupled to the control circuit 413, and the mouse pad 41 is coupled wiredly or wirelessly to the computer 13.

In the present embodiment, the first peripheral device 15 is exemplified as a mouse. The present embodiment is different from the embodiment in FIG. 1 and FIG. 2 in that the input system 40 further comprises a mouse pad 41. When the first peripheral device 15 (i.e., the mouse) moves, the encoding unit 153 generates a light control signal according to the keyboard indicator light control instruction outputted from the computer 13 to the keyboard device, in which the light control signal includes the moving information of the first peripheral device 15.

The light control signal, for example, could be any combination of the on/off of the indicator lights of the Scroll Lock key, the Caps Lock key and the Num Lock key.

The first peripheral device 15 transmits the light control signal to the computer 13. Since the light control signal is encoded by the keyboard indicator light control instruction, the computer 13 can directly transmit the light control signal to the mouse pad 41 when receiving it from the first peripheral device 15. The control circuit 413 of the mouse pad 41 controls the luminance change of the light emitting circuit 411 corresponding to the movement change of the first peripheral device 15 according to the light control signal.

The light emitting circuit 411, for example, could be a liquid crystal display element, a light-emitting diode element, an organic light-emitting diode element, or other display elements capable of displaying characters or symbols, to which the present invention is not limited.

In still another embodiment of the present invention, the light emitting circuit 411 includes a plurality of light emitting elements that are arranged around the mouse pad 41 as shown in FIG. 4. The control circuit 413 controls the luminance change of the light emitting circuit 411 corresponding to the movement change of the first peripheral device 15 according to the light control signal and, for example, can be implemented by the control circuit 413 to define that each light emitting element has a position coordinate value $(x_i, y_i)$ relative to its position on the mouse pad 41. The control circuit 413 acquires a position coordinate value (x, y) of the first peripheral device 15 (i.e., the mouse) on the mouse pad 41 according to the light control signal with the moving information of the first peripheral device 15. When $x_i=x$ or $y_i=y$, the control circuit 413 activates the light emitting element of the position coordinate $(x_i, y_i)$, and when $x_i \neq x$ or $y_i \neq y$, the control circuit 413 turns off the light emitting element of the position coordinate $(x_i, y_i)$. Accordingly, two rows of the light emitting elements on the upper and lower sides of the mouse pad 41 activate the one light-emitting element at the corresponding mouse position coordinate value x. That is, among the light emitting elements arranged around the mouse pad 41, the control circuit 413 activates the light emitting element corresponding to the position of the mouse. Accordingly, the user can be informed of the relative position of the mouse on the mouse pad 41 by observing the light emitting elements arranged around the mouse pad 41 when operating the first peripheral device 15 on the mouse pad 41. This improves the efficiency of operating games and/or programs. The aforementioned embodiment of controlling the light emitting circuit 411 according to the light control signal is merely illustrative, to which the present invention is not limited.

Figure 6:
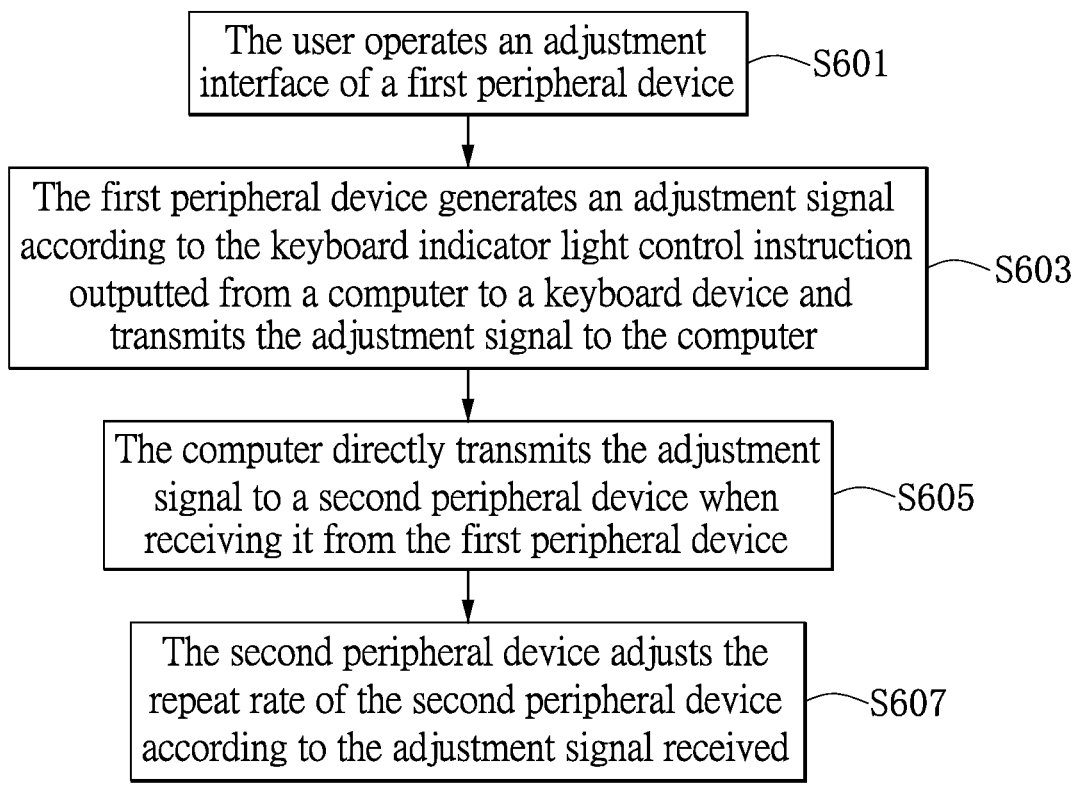
FIG. 6 shows a flowchart of an adjustment method for an input system according to one embodiment of the present invention.

FIG. 6 is a flowchart of an adjustment method for an input system according to one embodiment of the present invention. Referring to FIGS. 2 and 6, in step S601, when the user wishes to adjust the repeat rate of the second peripheral device 11, the user can operate the adjustment interface 151 of the first peripheral device 15 to execute the action of adjusting. In step S603, the encoding module 157 of the first peripheral device 15 generates an adjustment signal according to the keyboard indicator light control instruction outputted from the computer 13 to the keyboard device. The encoding module 157 wiredly or wirelessly transmits the adjustment signal to the computer 13 through the transmission module 155. The adjustment signal, for example, could be any combination of the on/off of the indicator lights of the Scroll Lock key, the Caps Lock key and the Num Lock key.

In step S605, since the adjustment signal is encoded by the keyboard indicator light control instruction, the computer 13 can directly transmit the adjustment signal to the second peripheral device 11 when receiving it from the first peripheral device 15. In step S607, the processing module 115 of the second peripheral device 11 wiredly or wirelessly receives the adjustment signal through the transmission interface 117, and then the decoding module 1151 decodes the adjustment signal. The controller 1153 adjusts the repeat rate of the second peripheral device 11 according to the decoded result of the decoding module 1151 to change the repeat rate of the signal outputting to the computer 13 when operating the input interface 111 according to the adjustment signal, thereby achieving the purpose of operating the first peripheral device 15 to adjust the repeat rate of the second peripheral device 11.

In still another embodiment of the present invention, the adjustment signal makes the first peripheral device 15 and the second peripheral device 11 have the same repeat rate.

In still another embodiment of the present invention, the adjustment signal makes the repeat rate of the second peripheral device 11 higher or lower than the repeat rate of the first peripheral device 15.

Figure 7:
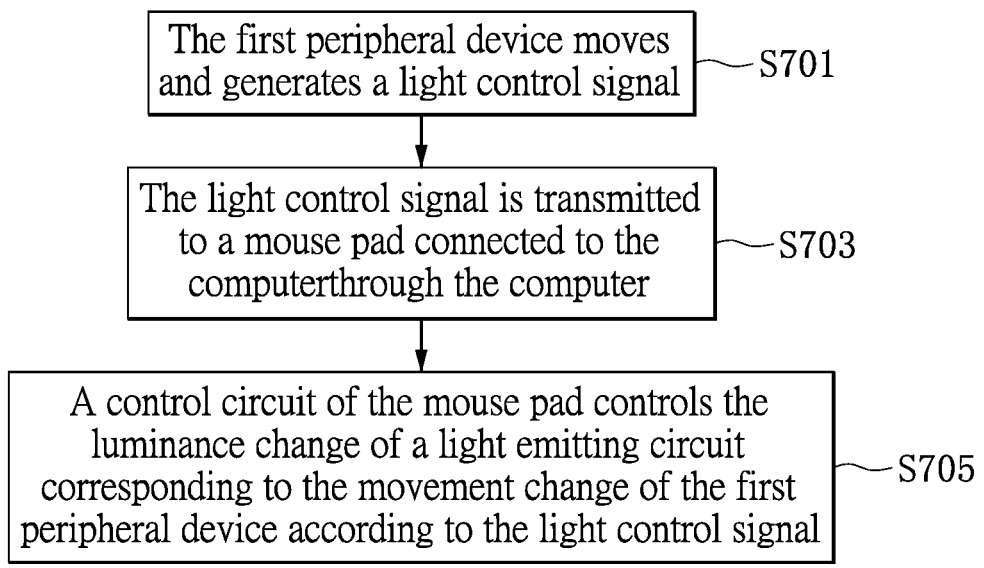
FIG. 7 shows a flowchart of an adjustment method for an input system according to another embodiment of the present invention.

FIG. 7 is a flowchart of an adjustment method for an input system according to another embodiment of the present invention. Referring to FIGS. 5 and 7, in the present embodiment, the first peripheral device 15 is exemplified by a mouse. In step S701, when the first peripheral device 15 moves, the encoding unit 153 generates a light control signal according to the keyboard indicator light control instruction outputted from the computer 13 to the keyboard device, in which the light control signal includes the moving information of the first peripheral device 15.

In step S703, the first peripheral device 15 transmits the light control signal to the computer 13. Since the light control signal is encoded by the keyboard indicator light control instruction, the computer 13 can directly transmit the light control signal to the mouse pad 41 when receiving it from the first peripheral device 15. In step S705, the control circuit 413 of the mouse pad 41 controls the luminance change of the light emitting circuit 411 corresponding to the movement change of the first peripheral device 15 according to the light control signal.

In summary, an input system, a peripheral device and an adjustment method according to the present invention generate the adjustment signal according to the keyboard indicator light control instruction outputted from the computer to the keyboard device to achieve the purpose of operating a peripheral device to adjust the repeat rate of another peripheral device.

The descriptions illustrated supra set forth simply the exemplary embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An input system, comprising:
a computer;
a first peripheral device connected to the computer for outputting a plurality of adjustment signals, including:
a transmission circuit, coupled to the computer;
a hardware encoder, coupled to the transmission circuit; and
an adjustment interface; and
a second peripheral device connected to the computer, including:
an input interface;
a transmission interface for connecting the computer; and
a processing circuit coupled to the input interface and the transmission interface, the processing circuit transmitting an input signal inputted from the input interface to the computer through the transmission interface at a character repeat rate, the character repeat rate being a number of characters repeated per second;
wherein the processing circuit receives one of the plurality of adjustment signals through the transmission interface and adjusts the character repeat rate according to the one of the plurality of adjustment signals;
wherein the adjustment interface of the first peripheral device is configured to make the hardware encoder generate the plurality of adjustment signals, which are encoded keyboard indicator light control instructions corresponding to different combinations of operation states of a plurality of keyboard indicator lights of the second peripheral device, wherein the different combinations of operation states of the plurality of keyboard indicator lights corresponds to different character repeat rates of the second peripheral device, respectively, wherein the adjustment signal outputted from the first peripheral device is the one of the plurality of adjustment signals, and the hardware encoder transmits the adjustment signal to the computer through the transmission circuit, so that the computer directly transmits the adjustment signal to the second peripheral device when receiving the adjustment signal from the first peripheral device, the second peripheral device is configured to be capable of decoding the adjustment signal and determining a corresponding character repeat rate.

2. The input system according to claim 1, wherein the keyboard indicator light control instruction is an indicator light control instruction of a Scroll Lock key, a Caps Lock key or a Num Lock key.

3. The input system according to claim 1, wherein the processing circuit includes a hardware decoder, the hardware decoder decoding the adjustment signal; and a controller coupled to the hardware decoder, the controller adjusting the character repeat rate according to the decoded result of the hardware decoder.

4. The input system according to claim 1, wherein the processing circuit increases or decreases the character repeat rate when receiving the adjustment signal.

5. The input system according to claim 1, wherein the adjusted character repeat rate of the second peripheral device is equal to the character repeat rate of the first peripheral device.

6. The input system according to claim 1, wherein the hardware encoder generating the adjustment signal by the keyboard indicator light control instruction outputted from the computer to the second peripheral device.

7. The input system according to claim 1, wherein the first peripheral device is a mouse, and the second peripheral device is a keyboard.

8. The input system according to claim 1, further comprising:
a mouse pad, wherein the first peripheral device is a mouse and the mouse pad comprises a light emitting circuit and a control circuit, a light control signal being generated when the mouse moves and the light control signal being transmitted to the mouse pad through the computer, the control circuit controlling the luminance change of the light emitting circuit corresponding to the movement change of the mouse according to the light control signal.

9. The input system according to claim 8, wherein the hardware encoder of the first peripheral device generating the light control signal according to the keyboard indicator light control instruction outputted from the computer to the second peripheral device, and the light control signal having the moving information of the mouse.

10. An adjustment method for an input system, the input system including a computer, a first peripheral device having a transmission circuit being coupled to the computer, a hardware encoder being coupled to the transmission circuit and an adjustment interface and a second peripheral device, the first peripheral device and the second peripheral device being connected respectively to the computer, comprising:
when the first peripheral device outputs a plurality of adjustment signals, transmitting one of the plurality of adjustment signals to the second peripheral device through the computer; and
when the second peripheral device receives the one of the plurality of adjustment signals, adjusting, by the second peripheral device, a character repeat rate of the second peripheral device according to the one of the plurality of adjustment signals, the character repeat rate being a number of characters repeated per second,
wherein the adjustment interface of the first peripheral device is configured to make the hardware encoder generate the plurality of adjustment signals, which are encoded keyboard indicator light control instructions corresponding to different combinations of operation states of a plurality of keyboard indicator lights of the second peripheral device, wherein the different combinations of operation states of the plurality of keyboard indicator lights corresponds to different character repeat rates of the second peripheral device, respectively, wherein the adjustment signal outputted from the first peripheral device is the one of the plurality of adjustment signals, and the hardware encoder transmits the adjustment signal to the computer through the transmission circuit, so that the computer directly transmits the adjustment signal to the second peripheral device when receiving the adjustment signal from the first peripheral device, the second peripheral device is configured to be capable of decoding the adjustment signal and determining a corresponding character repeat rate.

11. The adjustment method for an input system according to claim 10, wherein the character repeat rate of the second peripheral device is adjusted to be the same as, higher than, or lower than that of the first peripheral device according to the adjustment signal.

12. The adjustment method for an input system according to claim 10, wherein the first peripheral device is a mouse, a light control signal is generated when the mouse moves and the light control signal is transmitted to a mouse pad connected to the computer through the computer, the mouse pad having a light emitting circuit and a control circuit, the control circuit controlling the luminance change of the light emitting circuit corresponding to the movement change of the mouse according to the light control signal.

\* \* \* \* \*